2,706,166

MANUFACTURE OF ARTICLES OF RUBBER BONDED TO A BACKING

William Arthur Gurney, Castle Bromwich, England, assignor to Dunlop Tire and Rubber Corporation, Buffalo, N. Y., a corporation of New York No Drawing. Application January 7, 1953, Serial No. 330,175

8 Claims. (Cl. 154—139)

This invention relates to the manufacture of composite articles in which rubber is bonded to a rigid component e. g. to a metal component.

In the production of composite articles in which rubber is bonded to a rigid component, e. g. to a metal component, various methods have been devised for developing between the rubber and the rigid component a bond of adequate strength, e. g. a bond capable of withstanding a force exceeding 700 lbs. per square inch tending to separate the two components. For example, it has been proposed to apply to a surface of the rigid component and/or to a surface of a heat-vulcanizable rubber composition to be bonded thereto, a film of an organic polyisocyanate or polyisothiocyanate, to press the rigid component and the composition together with the treated surface of the one in contact with the other, and then to heat the assembly to vulcanize the composition. It has also been proposed to use epoxyline resins as adhesives, but these are not satisfactory as hitherto used for bonding rigid articles to rubber, and they do not give bonds of satisfactory bond strength. Moreover most epoxyline resins require a higher temperature to set the resins than the rubber can usually withstand without deterioration.

My invention provides a novel method of making composite articles having rubber bonded to a rigid component.

According to my present invention a method of making composite articles in which rubber is bonded to a rigid component comprises coating the surface or surfaces of the component with an epoxyline resin, placing a mass of heat-vulcanizable rubber composition in juxtaposition to the coated surface with a film therebetween comprising an organic polyisocyanate or polyisothiocyanate and heating the assembly under pressure to vulcanize the said composition and bond the rubber to the rigid component. Preferably the epoxyline resin is applied while in a partially polymerized condition and is hardened by effecting further polymerization before placing the heat-vulcanizable rubber composition in juxtaposition to it.

In one method of carrying out my invention for making articles in which rubber is bonded to a metal component, the surface of the metal component is first coated with a partially polymerized epoxyline resin, the resin is then hardened and a layer of an organic polyisocyanate or polyisothiocyanate is applied to the resin coating. The organic polyisocyanate or polyisothiocyanate layer may be applied as a solution in a volatile organic solvent, the solvent being subsequently allowed to evaporate. If desired the viscosity of the solution may be increased by incorporating in the solution a natural or synthetic rubber together with vulcanizing agents. The solution does not then flow off before the solvent has evaporated. The heat-vulcanizable rubber composition is next molded onto or around the coated metal component, as the case may be, and vulcanization is carried out by heating the assembly at a temperature at which vulcanization proceeds until the composition is vulcanized. Bonding of the rubber to the metal occurs concurrently.

When making articles by applying to the metal a premolded vulcanizable rubber composition, as for example, when bonding a sheet of heat-vulcanizable rubber composition to a sheet of metal, it is also possible to coat the metal with the epoxyline resin coating and to apply the organic polyisocyanate or polyisothiocyanate to the surface of the pre-molded rubber composition which is to be bonded to the metal; the metal and the molded heat-vulcanizable composition are then assembled so that the treated surfaces of the metal and of the rubber composition are in contact, the two are pressed together, and vulcanization is effected.

Epoxyline resins may be obtained by condensing an epihalohydrin or dihalohydrin with an alcohol or phenol containing at least two hydroxy groups. The molecules of condensation product thus obtained have repeating units each of which has a portion comprising the phenol or alcohol radical linked through an ether linkage with an hydroxyalkyl portion, successive repeating units being linked through an ether linkage connecting the phenolic or alcoholic radical in one unit with the hydroxyalkyl portion of the next repeating unit. At each end of the molecule are portions each comprising ethylene oxide groups and linked to the adjacent repeating unit through an ether linkage. Thus suitable resins may be obtained by condensing di(parahydroxyphenyl) methane, a dialkyl di(parahydroxylphenyl) methane or glycerol with epichlorhydrin. Some of the resins require elevated temperatures, e. g. temperatures of the order of 200° C. to effect hardening, but others are available which set in the cold.

As the epoxyline resin there may be used, for example, an epoxyline resin such as one sold under the registered trade-marks "Epon" or "Araldite," for example "Araldite" 985, most of which require temperatures of the order of 200° C. for hardening. The "Araldite" resins 101 and 102, however, set in the cold.

Suitable organic polyisocyanates include "Desmodur" R, which is a triphenylmethane tri-isocyanate, "Desmodur" H, which is hexamethylene di-isocyanate, or "Desmodur" T, which is toluene 2.4-di-isocyanate. Other suitable polyisocyanate compounds include those sold under the registered trade-mark "Vulcabond," e. g. "Vulcabond" TX, which is believed to be a mixture of alkylene di-isocyanates, and also isocyanatoaryl derivatives of natural or synthetic rubber such as are described and claimed in British Patent No. 633,846.

The method of the present invention is suitable for making composite articles comprising rubber bonded ferrous metal components, e. g. components of mold steel or stainless steel and it is also suitable for making composite products of rubber and light metal alloys, as for example, aluminum alloys and also magnesium alloys, for example, Elektron MG7 alloy, and also composite products of rubber and brass, particularly brass of low-copper content.

The method may also be employed to bond rubber to non-metallic rigid components, e. g. wood, molded resin products, resin-impregnated asbestos products, laminated resin, impregnated paper articles, and graphite blocks, cold setting epoxyline resins being used in the case of those rigid components which would be damaged by heating at the temperatures required to harden those epoxyline resins which set only at high temperatures.

The rubber component of the article may be either vulcanized natural rubber or a vulcanized synthetic rubber which is a polymer or copolymer of a conjugated diene hydrocarbon or chlorohydrocarbon.

The invention is illustrated by the following examples.

*Example I*

Two mild steel plates were degreased and cleaned with emery cloth and one face of each was coated with the epoxy resin "Araldite" 985, and heated for 60 minutes at 200° C. The resin surface of each plate was coated with a solution of a heat-vulcanizable rubber composition in ethylene dichloride in which had been added 5% of a triphenylmethane tri-isocyanate and allowed to dry. A heat-vulcanizable natural rubber composition containing sulphur, carbon black, antioxidant and a vulcanization accelerator was then molded between the two treated faces of the plates and heated at 153° C. for 20 minutes to effect bonding and vulcanization. The bond between the rubber and the metal had a tensile strength of 870 lbs. per square inch.

*Example II*

Two mild steel plates were degreased and coated with a mixture of 14 parts by weight of the epoxyline resin "Araldite" 101 and 1 part by weight of a compound sold under the name Hardener 951 and believed to consist of a polyethylene amine. The coated plates were allowed to stand for 48 hours at room temperature whereupon the treated surface of each plate when then coated with a solution of heat-vulcanizable rubber composition to which had been added 3 per cent by weight of the mixture of alkylene di-isocyanate sold under the name "Vulcabond" TX and allowed to dry. A tire-tread type of rubber was molded between the treated surfaces of the plates and heated for 20 minutes at 153° C. The resulting bond between the rubber and the metal plates had a tensile strength of 890 lbs. per square inch.

*Example III*

The procedure of Example II was repeated, except that the mixture of resin and hardener was replaced by a mixture of "Araldite" Casting Resin D with 10 per cent by weight of Hardener 951. The resulting bond between the rubber and the metal plates had a tensile strength of 670 lbs. per square inch.

Having described my invention, what I claim is:

1. A method of making composite articles in which rubber is bonded to a rigid component comprising coating the surface or surfaces of the component with an epoxyline resin, placing a mass of heat-vulcanizable rubber composition in juxtaposition to the coated surface with a film therebetween comprising a member of the group consisting of organic polyisocyanates and polyisothiocyanates and heating the assembly under pressure to vulcanize the said composition and bond the rubber to the rigid component.

2. A method according to claim 1 wherein the said resin is applied to the surface while in a partially polymerized condition and is hardened by effecting further polymerization thereof.

3. A method according to claim 2 wherein the epoxyline resin is one which sets at or about room temperature.

4. A method according to claim 1 wherein the said epoxyline resin comprises a condensation product of epichlorohydrin with a member of the class consisting of di(parahydroxyphenyl) methane, a dialkyl di(parahydroxyphenyl)methane and glycerol.

5. A method according to claim 1 wherein the member of the group consisting of the organic polyisocyanates and polyisothiocyanates is applied to the resin coating in solution in an organic solvent containing rubber to increase the viscosity thereof.

6. A method according to claim 1 wherein the organic polyisocyanate is a triphenylmethane triisocyanate.

7. A method according to claim 1 wherein the organic polyisocyanate is a hexamethylene di-isocyanate.

8. A method according to claim 1 wherein the organic polyisocyanate is toluene 2.4-di-isocyanate.

References Cited in the file of this patent

B. I. O. S. Final Report #349, German General Rubber Goods Industry, July 26, 1946, pp. 120–123 and 127.

C. I. O. S. File #XXXIII, 19, Central Rubber Organization at Leverkusen, Appendix VIII, September 6, 1946, pp. 1–4 and 73.

Ethoxylines by Preiswerk & Charlton, Modern Plastics, November 1950, pp. 85–88.

Epoxies—No Wonder, Modern Plastics, October 1952, pp. 89–94.